March 13, 1945.  L. V. WHISTLER ET AL  2,371,565
PUNCH AND DIE MECHANISM
Filed June 21, 1944  3 Sheets-Sheet 1

Lawrence V. Whistler
Sanford A. Whistler  Inventors,
By Emil Neuhardt
Attorney.

March 13, 1945.    L. V. WHISTLER ET AL    2,371,565
PUNCH AND DIE MECHANISM
Filed June 21, 1944    3 Sheets-Sheet 2
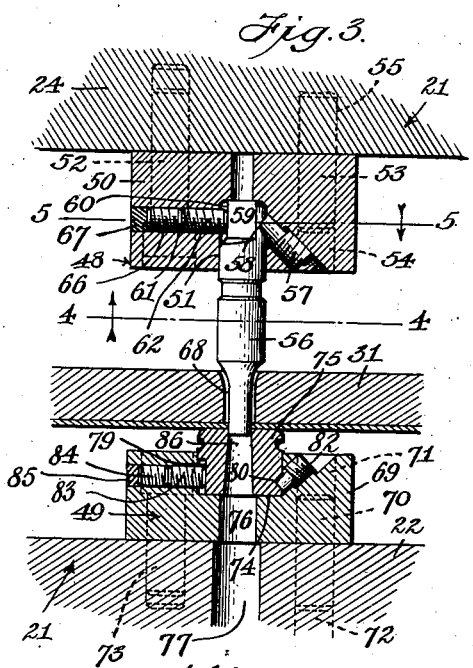
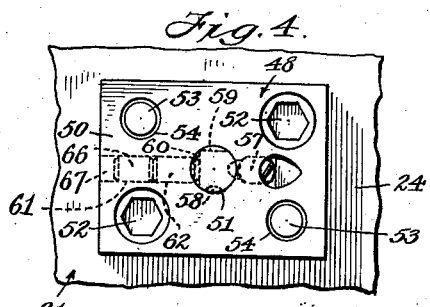
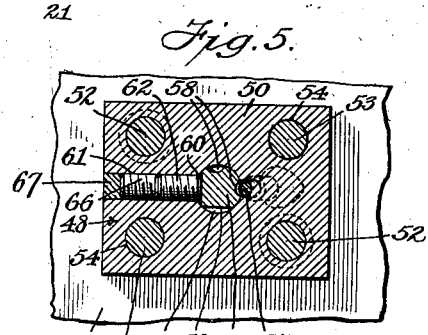
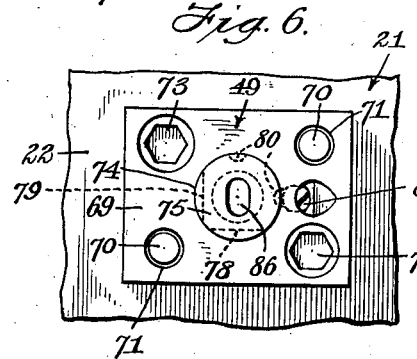
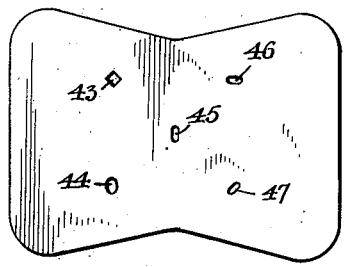
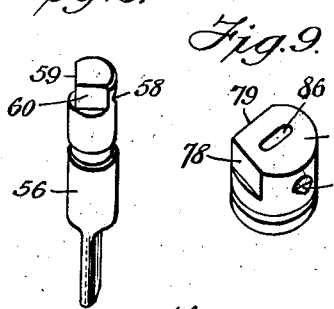
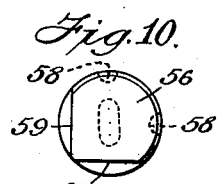
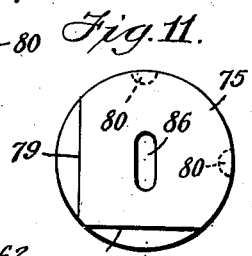
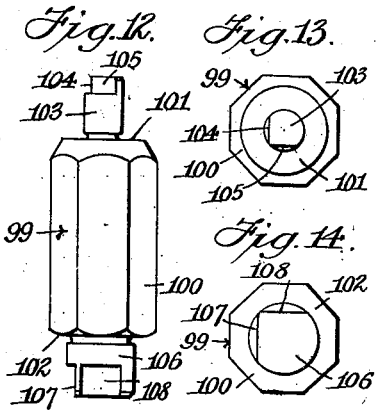
Lawrence V. Whistler
Sanford H. Whistler
Inventors.
By Emil Kushart
Attorney.

March 13, 1945.  L. V. WHISTLER ET AL  2,371,565
PUNCH AND DIE MECHANISM
Filed June 21, 1944   3 Sheets-Sheet 3
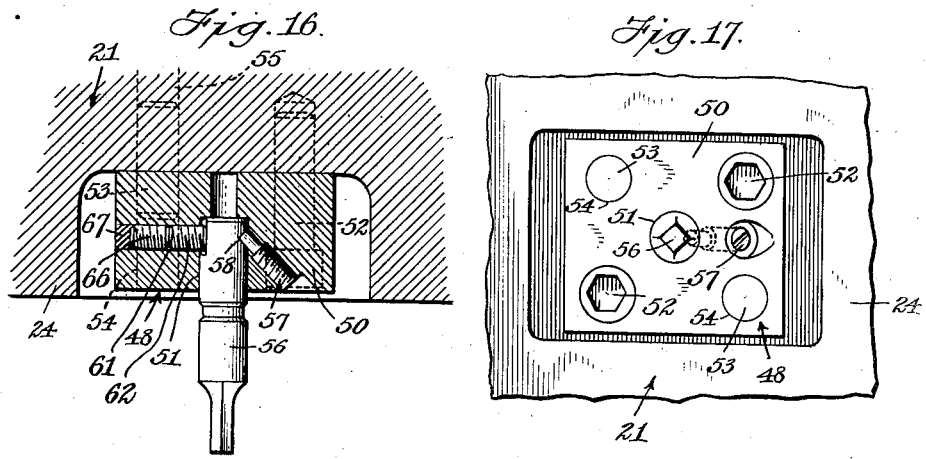
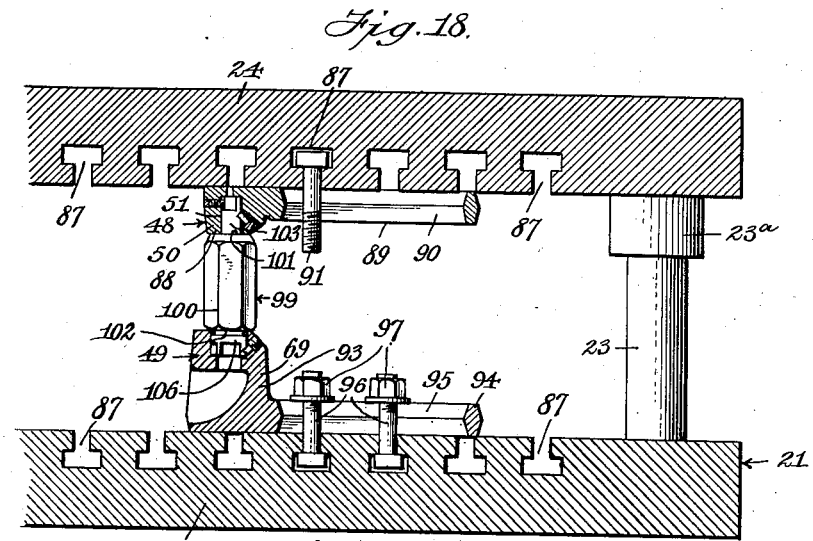
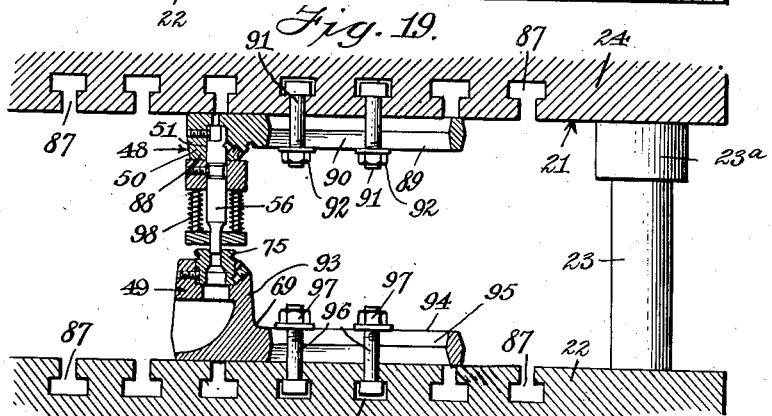
Lawrence V. Whistler
Sanford A. Whistler   Inventors
By Emil Neuhart   Attorney Patented Mar. 13, 1945

2,371,565

UNITED STATES PATENT OFFICE 2,371,565

PUNCH AND DIE MECHANISM

Lawrence V. Whistler and Sanford A. Whistler, Kenmore, N. Y.

Application June 21, 1944, Serial No. 541,370

30 Claims. (Cl. 164—118)

Our invention relates to punch-and-die mechanism, and more particularly to mechanism for punching non-circular openings in sheet metal or sheet metal stampings.

In setting up the two members of a perforating couple designed for perforating elongated, square, oval, or other non-circular holes in sheet metal, difficulty is encountered in securing a true registration of the punch-member of the perforating couple with the die-member thereof, and it is one of the objects of our invention to provide means whereby such registration will be assured and the relative placement of the punch and die-members be quickly effected.

Another object of our invention is to provide punch-and-die mechanism in which the article to be stamped can be stamped to the desired outline while punching elongated or other non-circular holes within the work-piece.

Another object of our invention is to provide the punch-member and the die-member with means whereby they can be positioned accurately within a die-set and so that a non-circular opening to be punched in a work-piece will be disposed at the desired angle and the punch element of the punch-member will be disposed in strict conformity with the die-element of the die-member.

A still further object of our invention is to provide the punch and die-elements of punch-and-die mechanism with position-determining regions and the punch-retainer and die-retainer with similar regions and with securing means for securing such elements in said retainers with a view of disposing the major diameter of the non-cylindrical punch end of the punch element and the correspondingly shaped punch-receiving opening in the die-element at predetermined angles and by utilizing such securing means retaining said elements in perfect registration.

A still further object of our invention is to provide the punch and die elements of a perforating-couple, or a punch and die-couple, as it may be termed, with two flat exterior portions disposed at a right angle to each other and to provide securing means in the retainers for such elements to engage one of said flat surfaces and thereby position and retain the major transverse dimensions of said elements at certain angles and in perfect registration one with the other and whereby said elements may be quickly adjusted by rotating the same through an arc of a circle of 90 degrees.

A still further object of our invention is to provide set-up means whereby the punch and die-couple and more particularly the punches and dies thereof will be co-axially arranged and the non-cylindrical and non-circular operating portions of the punches and dies, respectively, brought into perfect registration one with the other.

With the above and other objects in view our invention consists in the novel features of construction and the arrangement and combination of parts to be hereinafter described and more particularly pointed out in the subjoined claims.

In the drawings:

Fig. 3 is an enlarged vertical section through a punch and die-couple shown in association with a stripper-plate and a portion of a ram and shoe of a die-set.

Fig. 4 is a horizontal section taken on line 4—4, Fig. 3, looking up.

Fig. 5 is a horizontal section taken on line 5—5, Fig. 3.

Fig. 6 is a plan view of the die-member and a portion of a shoe of the die-set.

Fig. 7 is a plan view of a stamping, such as stamped by the combination of parts illustrated in Figs. 1 and 2.

Fig. 8 is a detached perspective view of a punch, the punching terminal of which is designed to punch a slot in a work-piece.

Fig. 9 is a detached perspective view of a die or die-bushing designed for co-action with the punch shown in Fig. 8, the die or die-bushing being shown inverted.

Fig. 10 is an enlarged top end view of the punch shown in Fig. 8.

Fig. 11 is an enlarged top plan view of the die or die-bushing shown in Fig. 9.

Fig. 12 is a side elevation of a set-up plug used for positioning the punch and die elements of a punch and die-couple in axial alinement and in perfect registration with respect to the trend of the operating end of the punch element and the punch-receiving opening in the die element.

Fig. 13 is a top plan view of the set-up plug shown in Fig. 12.

Fig. 14 is a bottom plan view of said set-up plug.

Fig. 15 is an enlarged longitudinal section through one of the set screws for maintaining the punch and die in rotatively adjusted positions.

Fig. 16 is a vertical section through a punch-member of a punch and die-couple showing the same in association with the ram of a die-set having a recess therein to receive a portion of the punch-member and thus lessen the overall shut-height of the die mechanism.

Fig. 17 is a bottom plan view of the parts illustrated in Fig. 16.

Fig. 18 is a vertical section of a portion of a die-set associated with a modified type of punch and die-retainers and showing our improved set-up plug in use for positioning the punch-retainer in proper relation to the die-retainer previously secured in place.

Fig. 19 is a view similar to Fig. 17 showing the punch element and the die or die-bushing secured in their retainers after having positioned such retainers in relative operating position by means of the set-up plug.

Figure 1:
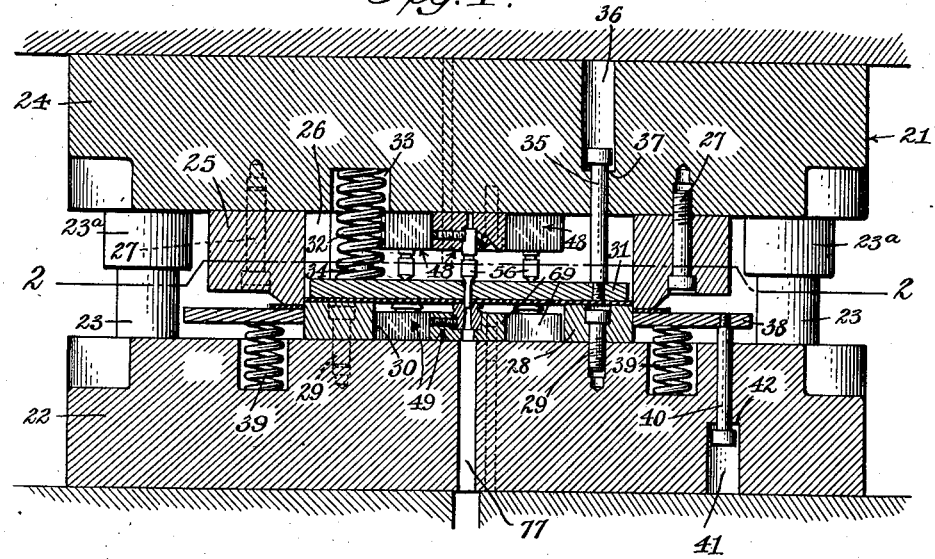
Fig. 1 is a vertical longitudinal section of our improved punch and die mechanism arranged within the die-set, the section being taken on line 1—1, Fig. 2.

Since we have illustrated at least two forms of punch and die couples in the drawings, it is to be understood that our invention is adaptable to punch and die-couples of various types; also that the punch and die-couples herein illustrated are associated in a representative manner with or embody the novel features of our invention and they furthermore embody features of our invention which can be readily employed in association with punch and die retainers of various types.

In Figs. 1, 2, 17 and 18 we have illustrated a die-set, so commonly commercially termed, and this die-set comprises a die-shoe 22 from which rise guide-posts 23 that slide in guide-bushings 23ᵃ secured in the ram 24 of the die-set and projecting downwardly therefrom. The die-set is placed within a punch or stamping press and has the shoe 22 secured to the bed of a press and the ram 24 secured to the ram of the press, the overall shut-height of the press being adjusted to the spacing of the ram with respect to the shoe of the die-set.

Figure 2:
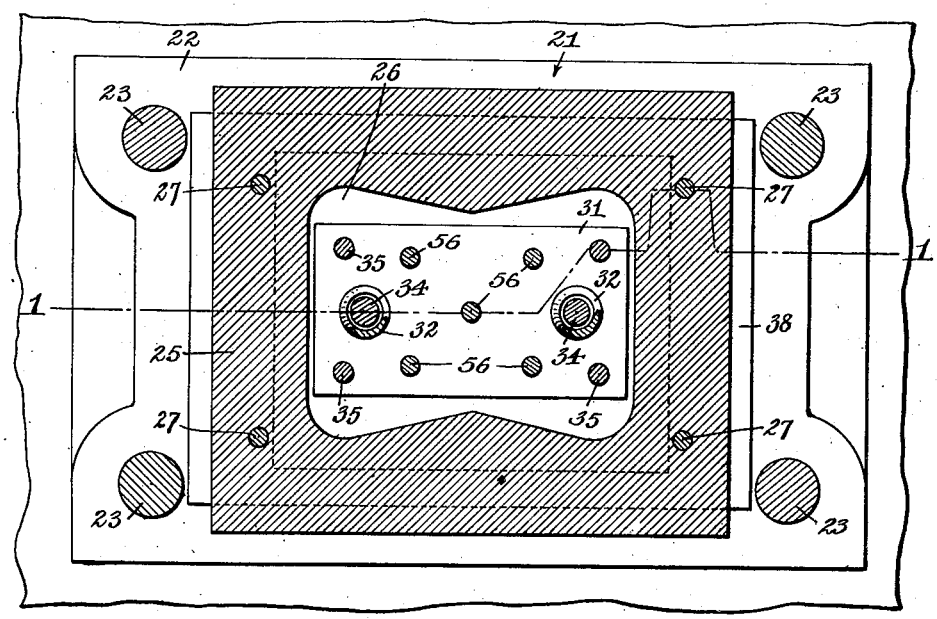
Fig. 2 is a horizontal section taken on line 2—2, Fig. 1.

In Figs. 1 and 2 we have illustrated die mechanism embodying a novel compound die for outlining the desired stamping and piercing or punching any desired arrangement of holes simultaneously with the outlining of the stamping. The die mechanism shown may, therefore be termed a single purpose mechanism.

Secured to the underside of the ram of a die-shoe is a female cutting or blanking-die 25, the die opening 26 of which is of the shape shown in Fig. 2, but which may be of any other desired shape, depending on the outline of the part to be stamped. This female blanking-die is fastened to the ram 24 by means of bolts 27 passed therethrough and threaded into the ram of the die-set. 28 designates the male cutting or blanking-die which is outlined to conform to the die opening 26 and it is secured to the shoe of the die-set by means of bolts 29. This male blanking-die 28 has a comparatively large opening 30 formed therein and resting thereon within the opening of the female blanking-die is a stripper-plate 31 held thereagainst by spiral springs 32 which are entered at their upper ends in downwardly-opening pockets 33 formed in the ram of the die-set.

In the particular structure illustrated in Figs. 1 and 2, the spiral springs 32 are centrally disposed above the stripper-plate 31, one near each end thereof and the lower ends of said springs may surround trunnions 34 rising from said plate. In this manner the lower ends of the springs are held against lateral deflection and by reason of their upper ends being retained in the pockets 33, like movement of the springs is prevented at their upper ends.

Stripper retainer bolts 35 are fastened at their lower ends into the stripper plate 31, the lower ends of said bolts being reduced in diameter and threaded to enter openings in said plate while the upper ends thereof are slidably arranged within bolt holes 36 enlarged along their upper portions to form upwardly facing shoulders 37. The heads of said bolts bear against said shoulders when the ram and shoe of the die-set are at their greatest point of separation and said bolts are caused to slide in said bolt holes during the final portion of the stamping operation. These stripper retainer bolts may more particularly be referred to as stripper guide-bolts, since in addition to retaining the stripper plate 31 in proper position within the die-opening 26 of the female die, they serve to guide the stripper plate vertically in its movements.

A second stripper plate 38 surrounds the male blanking-die 28 and its upper surface is normally flush with the upper surface of said die; it being so positioned by spiral springs 39 which are arranged within upwardly-opening pockets formed in the shoe 22 of the die-set. Said springs 39 extend upwardly from the upper open ends of said pockets and have their upper ends in forcible contact with the under surface of said stripper plate. Secured to said stripper plate 38 are stripper retainer or guide bolts 40 which are similar to the retainer or guide-bolts 35 and they extend downwardly from said stripper plate and enter bolt holes 41 formed in the die shoe, said bolt holes being enlarged at their lower ends to form downwardly-facing shoulders 42 against which the heads of said bolts bear when said stripper plate 38 is at its highest elevation, which is slightly above the upper surface of the male blanking-die 28. The spiral springs 39 are arranged underneath the stripper plate at opposite ends thereof and the retainer or guide-bolts 40 may be arranged near the four corners of said plate. The male blanking-die 28 and the female blanking-die 25 may be termed outlining dies since they are designed to stamp parts, such as shown in Fig. 7 and as shown it is, of course, understood that the part stamped will in every instance be in conformity with the outline of the male blanking-die 28 and the die-opening 26 in the female blanking-die.

In Fig. 7 we have shown five perforations or openings, one designated by the numeral 43 a square opening; a second designated 44 an oval opening; and the remaining three designated 45, 46 and 47 elongated openings or slots. All of these openings may be termed non-circular openings or holes.

While we have shown all openings or holes formed in the stamping to be non-circular, it is of course, understood that some of these may be circular openings, and that while we have shown our improved perforating means in combination with the outlining or blanking-dies just described, in many instances the perforating means, in the form of punches and dies, may be used without the outlining dies. Both circular and non-circular openings, holes or perforations may be required in a stamping and the perforating punches and dies will be used accordingly.

Within the opening 26 of the female blanking-die we may find it of advantage in many instances to employ one or more punch members 48 forming part of a punch and die-couple, or what may be termed a perforating couple, and within the opening 30 of the male blanking-die we then employ a mating die-member 49 for each punch-member or, as stated, these punch and die-members may be employed without resorting to the use of the outlining or blanking-dies. In all cases, however, some form of punch retainer is employed which is generally fastened to the ram 24 of the die-set. This punch-retainer regardless of its formation or construction will embody certain features of our invention, and is designated by the numeral 50.

The punch-retainers shown in Figs. 1, 3, 4, 5, 15 and 16 are structures of block-form somewhat greater in length than in width and they are provided centrally with punch-receiving holes 51 reduced at their upper ends to form downwardly-facing shoulders. These punch-retainers are fastened to the underside of the ram 24 of the die-set, which we also refer to as a punch-holder, by means of securing screws 52 passed therethrough at two diagonally opposite corners and threaded into the ram or punch holder 24. However, before securing the retainers in place, we utilize dowel-pins 53 which are driven into pin-holes 54 in the punch-retainer and extend upwardly therefrom and enter pin-holes 55 in the punch-holder or ram. These dowel-pins are arranged at the two remaining diagonally opposite corners of the punch-retainer, as clearly shown in Figs. 4 and 5. By means of the dowel-pins the punch-retainers are positioned parallel with a plane passing longitudinally through the die-set and are then secured in place by the screws 52.

56 designates the punch which is thrust into the punch-receiving hole 51 in the punch-retainer; its upper end being in contact with the downwardly facing shoulder formed therein and it is held against longitudinal movement by a securing screw 57 threaded diagonally into the retainer and having its inner end entering one of two V-shaped notches 58 formed in the punch near its inner end in planes at right angles to each other.

When a punch having a non-circular outer or operating end is used, we employ means for positioning the punch rotatably within the punch-retainer so that the major diameter of the punch, or more particularly of the non-cylindrical operating end of the punch, will be disposed in the proper direction or at the desired angle. With this in view, the upper end of the punch is provided with two cut-away flat surfaces 59 and 60 disposed at a right-angle to each other; the cross sectional major dimension of the operating end of the punch being parallel with one of said flat cut-away surfaces and at a right-angle to the other.

Formed centrally in the punch-retainer and extending from one end thereof to the punch-receiving hole 51 is a screw-threaded opening 61 into which a set-screw 62 is threaded. This screw may have a kerf at the outer end to receive a screw driver by means of which it may be threaded into place, but preferably the set-screw is formed as shown in Fig. 15; the outer end thereof having an angular socket 63 to receive a correspondingly shaped wrench by means of which it may be threaded into contact with one of the cut-away flat surfaces 59 or 60 of the punch, depending on the direction in which the non-circular perforation in the stock is to trend, whether longitudinally or transversely. Assuming the set-screw 62 is to be in contact with the cut-away flat surface 59 of the punch, the slot in the work-piece will be stamped lengthwise therein, and when the slot is to be stamped transversely in the work-piece, the set-screw will be fastened in place against the cut-away flat surface 60 of the punch. It is, of course, understood that the securing screw 57 is unthreaded sufficiently to bring its inner end out of contact with the punch so that the latter may be rotated into desired position for bringing the set-screw 62 into contact with the proper cut-away flat surface, after which the set-screw may be tightened. For this purpose, the punch has the two notches or depressions 58, previously described, one diametrically opposite each cut-away flat surface, to be used selectively in conjunction with the securing screw 57 threaded diagonally through the punch 56 and entered in the selected notch or depression 58, depending on the particular cut-away flat surface to be employed in the setting-up of the punch and die mechanism. After the punch is thus rotatably adjusted, the set-screw 62 is tightened against the punch, a lock-screw 66 is threaded into the opening 61 so as to bear against the outer socketed end of the set-screw 62, and we preferably seal the set-screw and lock-screw in position by means of a seal 67. The seal may be metallic, plastic, or any other type of seal and it serves to prevent tampering with the adjustment of the punch made.

The operating end of each punch is positioned within an opening 68 in the stripper-plate 31 and it is designed to enter the die or die-bushing associated therewith. For this purpose we employ die-retainers 69 which are positioned in place within the opening 30 in the male blanking die by means of dowel-pins 70 driven into dowel-pin openings 71 in the retainer and entering dowel-pin openings 72 in the shoe of the die-set. Like the dowel-pins of the punch-retainer, the dowel-pins of this die-retainer are arranged at diagonally opposite corners, as shown in Fig. 6, and securing screws 73 are passed through the two remaining diagonally opposite corners of the die-retainer and threaded into the die-shoe, as shown in Figs. 3 and 6.

The die-retainer has a die-receiving socket 74 opening upwardly therein to receive a die or die-bushing 75. A slug passage 76 extends from said socket downwardly to the bottom of the die-retainer and registers with a slug passage 77 in the die-shoe through which the slugs stamped from the work-piece pass.

Like the punch, the die or die-bushing is provided with two cut-away flat surfaces 78, 79 arranged at a right-angle to each other and it also has two depressions 80, one diametrically opposite each cut-away flat surface to be used selectively in conjunction with a securing-screw 82 threaded diagonally through the die-retainer 69 and entered in the selected depression 80, depending on the particular cut-away flat surface to be employed in the setting-up of the punch and die mechanism. Threaded into the die-retainer 69 from one end thereof is a set-screw 83 which is adapted to impinge with its inner end against the effective cut-away flat surface and behind the set-screw is a lock-screw 84 the inner end of which bears against the outer end of the set-screw 83 and serves to lock the latter against movement. Like the punch-retainer, the set-screw and lock-screw are sealed with a metallic or other means of sealing 85 so that these screws will not be tampered with.

The die or die-bushing 75 is provided with a non-circular punch-receiving opening 86 to match the operating end of its mating punch, the lower end of which opening is in communication with the slug passage 76 formed in the die-retainer, which in turn opens into the slug passage 77 in the shoe of the die-set. The punch-receiving opening has its greatest dimension parallel with one of the cut-away flat surfaces 78 or 79 and is, therefore, at a right-angle to the other of said cut-away flat surfaces. Consequently, when utilizing one of said flat surfaces as a means of determining the position of the hole to be punched in a work-piece, the greatest dimension of said hole will trend longitudinally and when using the other flat surface the hole will trend transversely. For example, the elongated opening or slot 45 shown in the stamping illustrated in Fig. 7 of the drawings trends transversely, while the elongated opening or slot 46 trends longitudinally. The square opening or hole 43 shown in said figure has its greatest dimension extending both longitudinally and transversely, since the greatest dimension is from each corner to the opposite corner, and where an oval opening is punched in a stamping, such as shown at 44 in Figure 7, the greatest dimension of said opening may be either transverse or longitudinal, the opening 44 shown in said figure is, however, one trending transversely.

It is to be understood that the elongated opening or slot 47 shown in said figure is disposed at an angle of 45 degrees to a plane extending longitudinally through a stamping or through the die-set and when such or any other angular disposition of an opening is required, we find it of advantage to resort to the use of punch and die-couples of the type illustrated in Figs. 18 and 19, which will be hereinafter described.

While we have shown securing screws 62 and 73 at diagonally opposite corners of the punch-retainer and die-retainer, respectively, and dowel-pins at the remaining diagonally opposite corners of the retainers, this arrangement may be changed so long as the dowel-pins, regardless of their locations in the retainers, serve to position the latter in proper place on their respective supports and the securing screws, whether one or more are used, fasten the retainers securely to their supports.

It is, however, desirable to locate the securing screws fastening the punches and dies in their respective retainers in such position in the retainers that they will be diametrically opposite one or the other of the cut-away flat surfaces 59 or 60 of the punch and one or the other cut-away flat surfaces 78 or 79 of the die-bushing, and since the securing screw receiving-depressions or notches 58 and 80 in the punch and the die-bushing are each diametrically opposite a cut-away flat surface, after rotatably adjusting the punch and the die-bushing by means of co-action of the set-screws with the selected cut-away flat surfaces, a securing-screw receiving-depression or notch will always be presented to the securing-screw by means of which the punch and die-bushing are secured in their respective retainers.

In Figs. 16 and 17 we have shown the ram or punch-holder 24 recessed and the punch-retainer entered into the recess so that only the punch extends beneath the surface of the ram or punch-holder. This arrangement may be found desirable when the overall shut-height of the die-set is lessened.

In Figs. 18 and 19 we have shown the ram and shoe of a die-set with transversely-disposed parallel T-slots 87 and the punch and die-retainers of considerable length so as to extend across a number of said T-slots when applied to the surfaces of said ram and die-shoe. In this instance the punch-retainer has an enlargement or head 88 at one end thereof provided with the punch-receiving hole 51 and in other respects the punch-retainer is similar to the punch-retainers previously described, with the exception that it has an arm 89 extending laterally from one side of said head provided with a slot 90, which extends lengthwise therethrough and through which are to be passed screw-bolts 91, the upper headed portions of which are entered in T-slots in the ram. Said bolts have nuts 92 applied thereto for fastening the retainer in any desired position and at any desired angle against the underside of the ram. The die-retainer is provided with an enlargement or head 93 at one end thereof and in all instances this die-retainer is similar to the die-retainers herein previously described, with the exception that it also has an arm 94 extending laterally therefrom which is provided with a slot 95 through which screw bolts 96 are passed, the headed end portions of which are entered in selected T-slots in the shoe of the die-set; said screw-bolts having nuts 97 for tightening the screw-bolts and die-retainer in any desired position on the die shoe 22.

In Fig. 19 we have shown a stripper-device 98 secured to the punch directly beneath the headed end of the punch-retainer, thus making it apparent that where die-mechanism, such as shown in Figs. 1 and 2, is not required for stamping a part to desired outline and perforating the same, individual stripper-devices may be applied to the punch and die-couples or each of them, as the case may be.

It is to be understood that the T-slots shown in the ram and shoe of the die-set may be formed in any other punch and die-holders or supports to punch non-circular or elongated perforations at any desired angle in a stamping or other work-piece, as for example shown at 47 in Fig. 7. Where such perforations are required it is only necessary to secure the retainers to their respective supports at a desired angle to a plane passing longitudinally or transversely through such supports and when such retainers are so angularly disposed, one of the cut-away flat surfaces on the punch and on the die-bushing will be parallel with the arms of said retainers and the other at a right angle thereto.

We have found that a single set-screw engaging a cut-away flat surface, such as either the flat surface 59 or 60 on a punch or the flat surface 78 or 79 on a die-bushing will in most instances retain the punch and the die-bushing in proper rotative position, but when comparatively large elongated openings are to be punched in a work-piece and these flat surfaces are of considerable area, we prefer to employ two set-screws for each flat surface, the set-screws being arranged one next to the other so that they impinge against the flat surface at two spaced-apart points.

In Fig. 18 we have shown a set-up plug 99 used in connection with the two members of a punch and die-couple for the purpose of co-axially alining one member with the other and while this set-up plug is shown in connection with elongated punch and die-retainers used in association with T-slots formed in their respective supports, it will be apparent that this set-up plug can be as readily used in connection with other types of retainers which may fall within the scope of our invention. This set-up plug is used before applying the punch to its retainer and the die-bushing to its retainer, and as best shown in Figs. 12, 13 and 14 it comprises a comparatively large body portion 100 which, for convenience in handling the plug, is made octagonal in cross section but may have any other cross sectional formation. By enlarging the body portion of this plug, flat contact surfaces 101, 102 are provided respectively at its upper and lower ends, which are adapted to be brought into contact with the lower face of the punch-retainer and the upper face of the die-retainer, and in the case of the die-retainer shown in Fig. 18, against the lower and upper faces of the enlargements or heads of the punch and die-retainers therein shown. Extending upwardly from the flat contact surface 101 is what we term a punch-plug element 103 which is of a length and diameter to conform to the length and diameter of the punch-receiving hole 51 in the punch-retainer or it may be a trifle shorter than the length of said punch-receiving hole to assure perfect contact of the flat contact surface 101 with the underside of the punch-retainer or that portion of the punch-retainer in which the punch-receiving hole is arranged. The said punch-plug element has cut-away flat surfaces 104, 105 at its upper end, one flat surface being at a right-angle to the other so as to conform exactly to the cut-away flat surfaces 59 and 60 of the punch to be inserted into the punch-retainer. Projecting axially from the flat contact surface 102 at the lower end of the body portion 100 is a die-plug element 106 which is of a length and diameter to conform to the die-receiving socket 74 in the die-retainer, or this plug may be of slightly less length than the depth of said socket to assure perfect contact of the flat contact surface 102 with the flat contact surface of the die-retainer or the upper face of that portion of the die-retainer in which the die-receiving socket is arranged. The said die-plug element has cut-away flat surfaces 107, 108 at its lower end, each of which is at a right-angle to the other.

It is, of course, to be understood that the under faces of the punch-retainers and the upper faces of the die-retainers are machined so that when applied to their respective supports, such as the ram or shoe of a die-set or other suitable supports, they will be parallel with the underface of the punch support or holder and the upper face of the die support or holder; also that the upper and lower faces of the body portion of the set-up plug are machined parallel and at a true right-angle to the axis of the plug. Consequently, these plugs are employed for properly positioning the punch and die-retainers relatively and this is accomplished by selecting the exact position required for one of the retainers of each punch and die-couple and adjusting the other by means of this set-up plug therewith.

As clearly shown in Fig. 18, the die-retainer is fastened in place by means of the screw-bolts 96, the exact center of the die-receiving socket and the angular position of the arm 94 being predetermined. The ram or other support, if not sufficiently elevated is then raised to permit the die-plug element 106 of the set-up plug to be entered in the die-receiving socket of the die-retainer so that one of the two cut-away flat surfaces 107 or 108 of said plug confronts the set-screw 83 in said retainer and the diametrically opposite notch or depression 80 is positioned to receive the securing screw 82. Both screws are then temporarily tightened. Having thus established the angularity of the non-circular perforation to be stamped in a work-piece, the screw-bolts 96 are then tightened and the mating punch-retainer may now be positioned accordingly. Proper positioning of the punch-retainer is accomplished by entering the upper or punch-plug element 103 in the punch-receiving hole 51 of the punch-retainer, lowering the ram or other punch-holder or support the necessary distance for the purpose. The punch-retainer is then swung on the punch-plug element as a center so as to position the punch-retainer to approximately conform to the position of the die-retainer and by means of one or both screw-bolts 91, loosely fastening the punch-retainer against the ram or other punch-holder or support so as to allow a final exact adjustment. This is accomplished by tightening the set-screw 62 in the punch-retainer, which will cause said screw to assume a true right-angular position with reference to the confronting cut-away flat surface on the set-up plug and by tightening the securing-screw 57 in said retainer, the latter will be in precisely the position in which the die-retainer has been adjusted. It is then only necessary to fasten the punch-retainer in place by tightening the screw-bolts 91.

The ram is then elevated and the set-up plug loosened from both retainers and removed from the die-set. The punch and its mating die or die-bushing are then applied to the retainers in the manner hereinbefore described, utilizing one or the other of the two cut-away flat surfaces of both to position the punch and die or die-bushing so that the non-cylindrical punch terminal of the punch will register with the non-circular punch-receiving opening in the die or die-bushing, and both will then be positioned at the desired angle.

In cases where dowel-pin holes for dowel-pins and the threaded holes for the securing-bolts of the punch and die-retainers are formed in the respective punch and die-supports or holders, the set-up plug is not required, since such pins, bolts, and holes establish the desired co-axial relationship between the punches and dies and their exact positions on their supports or holders; such punch and die-couples being illustrated in the figures preceding Figs. 18 and 19.

Having thus described our invention, what we claim is:

1. Punch and die mechanism, comprising a die-holder and a punch-holder, a punch-retainer carried by said punch-holder and a die-retainer carried by said die-holder, said die-holder having a slug passage therethrough and said punch and die holders being relatively movable in a plane perpendicular to their respective surfaces, said die-holder having a pilot-pin hole and a screw-threaded hole and said die-retainer having a screw-bolt hole alined with said screw-threaded hole and a pilot-pin hole alined with the pilot-pin hole in said die-holder, a pilot-pin entered in said pilot-pin holes, a screw-bolt passed through the screw-bolt hole of said die-retainer and threaded into the screw-threaded hole of said die-holder, said die-retainer having an upwardly-opening socket and a passage in communication with said socket and the slug passage in said die-holder, a die-bushing fitting into said socket and having a peripheral notch, a securing-screw extending diagonally in said die-retainer and having its inner end engaging said notch, said punch-retainer having a punch-receiving hole therein, a punch entered in said punch-receiving hole and extending downwardly therefrom, and means to secure said punch in said punch-retainer.

2. Punch and die mechanism, comprising a punch-holder and a die-holder, a punch-retainer secured to said punch-holder, a die-retainer secured to said die-holder, spaced-apart pilot-pins entering said punch-retainer and said punch-holder, spaced-apart pilot pins entering said die-retainer and said die-holder, means for securing said punch and die-retainers to their respective punch and die-holders after being positioned by said pilot-pins, a punch entered in said punch-retainer, said punch-retainer having a punch-receiving hole to permit of rotatable adjustment of the punch therein and said punch being provided with cut-away flat portions at its entered end disposed at a right-angle to each other, said punch having a non-circular punch terminal, means carried by said punch-retainer for selectively engaging said cut-away flat surfaces after rotatively positioning said punch within said punch-retainer to maintain said punch in rotatively adjusted position, means for securing said punch within said retainer, said die-retainer having a die-receiving socket and means to discharge slugs therefrom, a die rotatably adjustable in said socket and having cut-away flat portions at right-angles to each other and a punch-receiving opening conforming to the non-circular formation of the punch terminal of said punch, and means for selectively engaging said last-mentioned cut-away flat portions after rotatably adjusting said die to position its punch-receiving opening so as to correspond to the rotative position given the punch terminal of said punch.

3. Punch and die mechanism, comprising spaced-apart punch and die-holders, said holders being relatively movable in a plane perpendicular to their confronting surfaces, a punch-retainer having a removable punch and being secured to said punch-holder, a die-retainer secured to said die-holder and having a die located co-axially with said punch by the positioning and securing of said retainers to their respective holders, said punch having a non-cylindrical punch terminal and said die having a punch-receiving opening conforming to the non-cylindrical formation of the terminal of said punch, said punch and die being each rotatably adjustable within their respective retainers to position the punch terminal of said punch and the punch-receiving opening in said die at any desired angle and said punch and punch-retainer and said die and die-retainer having co-acting means whereby corresponding rotatable adjustments of said punch and said die can be attained and maintained.

4. In punch and die mechanism, a punch-retainer having a punch-receiving hole, a punch having one end entered in said hole and having its other end non-cylindrical in cross section with the dimension in one direction thereof greater than in another, a retainer-device in said punch-retainer accessible from the exterior thereof and extending to said punch-receiving hole, the punch where entered in said punch-receiving hole having flat surfaces in different planes so that upon rotatable adjustment of said punch within said punch-receiving hole the desired flat surface will be presented to said retainer-device, said retainer-device being movable for contact with the selected flat surface presented thereto to maintain said punch in rotatably adjusted position.

5. In punch and die mechanism, a punch-retainer having a punch-receiving hole, a punch having one end entered in said hole and having its other end or terminal non-cylindrical in cross section with the dimension in one direction thereof greater than in a direction at a right angle thereto, a set-screw in said punch-retainer accessible from the exterior thereof and extending to said punch-receiving hole, the punch where entered in the punch-receiving hole having flat surfaces disposed at a right-angle to each other so that upon rotatable adjustment of said punch within said punch-receiving hole the desired flat surface will be presented to said set-screw, said set-screw being adapted for contact with the selected flat surface presented thereto to maintain said punch in rotatably adjusted position, one of said flat surfaces being parallel with a plane passing through the greatest transverse dimension of said punch terminal and the other being parallel to a plane passing through the lesser dimension of said punch-terminal.

6. In punch and die mechanism, a die-retainer having a die-receiving socket, a die-bushing entered in said socket having a punch-receiving hole of greater dimension in one direction than another, a retainer-device in said die-retainer accessible from the exterior thereof and extending to said die-receiving socket, said die-bushing having flat surfaces in different planes so that upon rotatable adjustment thereof within said die-receiving socket the desired flat surface will be presented to said retainer-device, said retainer-device being movable for contact with the selected flat surface presented thereto so as to maintain said die-bushing in rotatably adjusted position.

7. In punch and die mechanism, a die-retainer having a die-receiving socket and a slug passage extending from said socket, a die provided with a non-circular punch-receiving hole having its greater dimension in one direction and its smaller dimension in a direction at a right-angle thereto, a set-screw in said die-retainer accessible from the exterior thereof and extending to said die-bushing, said die-bushing having flat surfaces disposed at a right angle to each other so that upon rotatable adjustment of said die-bushing within said die-receiving socket the desired flat surface will be presented to said set-screw, said set-screw being rotatable for contact with the flat surface presented thereto so as to maintain said die-bushing in rotatably adjusted position, one of said flat surfaces being parallel with a plane passing through the larger dimension of said punch-receiving hole and the other being parallel with a plane passing through the smaller dimension of said punch-receiving hole.

8. In punch and die mechanism, a punch and die-couple comprising a punch-member having a punch rotatably adjustable therein and a die-member having a die rotatably adjustable therein, said punch having a non-circular punch terminal and said die having a correspondingly shaped punch-receiving hole, means embodied in said punch-member to position and maintain the punch in either of two positions rotatively at 90 degrees to each other, means embodied in the construction of said die-retainer to position and maintain the die therein in either of two positions rotatively at 90 degrees to each other so that the punch-receiving opening in said die is in perfect registration with the punch terminal of said punch, means carried by said punch-retainer to secure said punch against movement longitudinally, and means to secure said die in said die-retainer against movement longitudinally.

9. In punch and die mechanism, a support, a retainer element secured to said support in predetermined position, a perforating element rotatably adjustable in said retainer-element and having flat surfaces on its peripheral face and a peripheral notch diametrically opposite each of said flat surfaces, a set-screw carried by said retainer-element and engaging the flat surface of the perforating element presented thereto under rotatable adjustment of said perforating element, and a securing screw in said retainer-element entered in the notch of said perforating-element diametrically opposite the point of engagement of said set-screw with said perforating element.

10. In punch and die mechanism, a support having a flat face, a retainer-element secured to the flat face of said support in desired position and having a hole therein perpendicular to said flat face and a threaded hole extending from one side thereof to said first-mentioned hole, a perforating element rotatably adjustable in said first-mentioned hole provided with peripheral flat surfaces disposed at a right angle to each other so that upon rotation of the element within said hole through an arc of 90 degrees either of said flat surfaces may be disposed at a right-angle to the axis of said threaded hole so as to confront the inner end of the latter, a set-screw threaded into said threaded hole and having the inner end in contact centrally with the said confronting flat surface, a lock-screw entered in said threaded hole and having its inner end in engagement with the outer end of said set-screw, means for sealing the outer end of said hole so as to render said lock-screw and said set-screw inaccessible, and means for securing said perforating element in said retainer so as to prevent movement lengthwise of said perforating element.

11. In punch and die mechanism, a pair of spaced-apart supports having supporting faces confronting each other and being relatively movable in a plane perpendicular to said supporting faces, a punch-retainer secured to one of said supporting faces and having a punch-receiving hole whose axis is at a right-angle to said supporting faces and having also a retainer-device in a plane at a right-angle to the axis of said punch-receiving hole and being movable into the latter and away from the same, a die-retainer secured to the other of said supporting faces and having a die-receiving socket whose axis is at a right-angle to said supporting faces, a retainer-device carried by said die-retainer in a plane at a right-angle to the axis of said die-receiving socket and movable into the latter and away from the same, means to secure one of said retainers to its supporting face, setting-up means applied to said last-mentioned retainer when secured to its supporting face, the relation of said setting-up means to said last-mentioned retainer being determined by the retaining-device of the latter and said setting-up means being adapted to engage the other of said retainers and position the same to correspond to the position of said secured retainer so as to axially aline the punch-receiving hole in one retainer with the die-receiving socket of the other retainer and to position the retaining devices of said retainers in corresponding positions, means to secure said other retainer to its support, said setting-up means being removable from said retainers upon separation of said supports and after securing said other retainer to its support, a punch entered in said punch-receiving hole, a die entered in said die-receiving socket, both said punch and said die being rotatably adjustable and having means engaged by the retaining-devices of said retainers to position and maintain said punch and die in their rotatably adjusted positions and in their respective retainers, and means carried by said retainers for locking said punch and die against lengthwise-movement.

12. In punch and die mechanism, a pair of spaced-apart supports having flat supporting faces confronting each other and being relatively movable in the direction of a plane perpendicular to said supporting faces, a punch-retainer secured to one of said supporting faces and having a punch-receiving hole whose axis is at a right angle to said supporting faces and having a set-screw therein adapted to be threaded into said punch-receiving hole and accessible from the exterior of said punch-retainer, a die-retainer secured to the other of said supporting faces and having a die-receiving socket whose axis is at a right angle to said supporting faces and having a set-screw therein adapted to be threaded into said die-receiving socket and accessible from the exterior of said die-retainer, means for securing one of said retainers to its supporting surface, and a set-up device having a terminal at one end adapted to enter the die-receiving socket of said die-retainer and a terminal at its other end adapted to enter the punch-receiving hole in the punch-retainer upon movement of said supports and disposition of said punch-retainer on its supporting face to correspond to the position given the die-retainer on its supporting face, each terminal of said set-up plug having flat surfaces disposed at a right angle to each other and being adapted to be rotated to position either of said flat surfaces in confronting relation to the set-screws in said retainers, said set-up plug serving the dual purpose of co-axially alining the punch-receiving hole in said punch-retainer with the die-receiving socket of said die-retainer and of adjusting the relative positions of said retainers, means to secure said retainers to their respective supporting faces when in adjusted positions, a punch adapted to be entered into said punch-receiving hole and having a non-cylindrical punch terminal, a die adapted to be entered in said die-receiving socket and having a non-circular punch-hole conforming to the non-cylindrical punch terminal of said punch, said punch and said die having flat surfaces disposed at a right angle to each other to conform to those on the terminals of said set-up plug, corresponding flat surfaces of said punch and die being presented, respectively, to the inner ends of said set-screws so that upon tightening the latter both said punch and said die will be positioned and maintained in desired rotative position so as to punch a perforation in a work-piece with the major dimension of said perforation in the desired direction.

13. A set-up plug for positioning punch and die-retainers on supports in proper relation to each other and in desired positions to prepare for punching non-circular or elongated holes in sheet metal or other material, said set-up plug having terminals provided with flat surfaces disposed at a right angle to each other and said flat surfaces being adapted to be positioned to confront definite circumferentially-disposed points of said retainers to position said retainers in corresponding relation, said flat surfaces having a definite relation to the axis of a punch and die to be secured to the respective retainer.

14. In punch and die mechanism, a pair of spaced-apart supports relatively movable in the direction of a plane at a right angle to the confronting faces of said supports, a retainer secured to one of said supports, a retainer applied to the other of said supports in a manner to permit of adjusting the same in proper relation to said secured retainer, each of said retainers having a hole therein and retaining means at a definite point in the circumference of its hole, a punch adapted to be entered in the hole of one of said retainers and having at least two contact points spaced-apart circumferentially with respect to each other, a die adapted to enter the hole of the other retainer and having at least two contact points spaced-apart circumferentially with respect to each other, the contact points of said punch and die being adapted to be selectively brought into alinement with the retaining means of the respective retainers upon rotation of the punch and die, and a set-up plug having terminals at opposite ends provided with correspondingly spaced-apart contact points arranged circumferentially with respect to each other, one of said terminals to be entered in the hole of said die-retainer and the other in the hole of said punch-retainer with the selective contact points of said terminals engaged by the retaining means of said retainers preparatory to securing the punch and die within the latter.

15. In punch and die mechanism, a punch-retainer having a punch-receiving hole and a set-screw disposed at an angle to said punch-receiving hole, a punch entered in said punch-receiving hole and having circumferentially spaced-apart contact-regions disposed in planes at an angle to each other and in line with said set-screw, said punch being rotatably adjustable to position a selected contact region in line with said set-screw, said punch being tightened in place by means of said set-screw, a die-retainer having a die-receiving socket and a set-screw at an angle to said socket, a die rotatably adjustable in said socket and having circumferentially spaced-apart contact regions in planes at an angle to each other, said die being rotatably adjustable to position a selected contact region thereof in line with said last-mentioned set-screw, said die being tightened in place by means of said set-screw, and means to seal said set-screws after rotatable adjustment of said punch and die so as to prevent tampering therewith.

16. Punch and die mechanism, comprising spaced-apart punch and die-holders relatively movable in a plane perpendicular to the confronting surfaces of said holders, a punch-retainer have a removable punch and being secured to said punch-holder, a die-retainer having a removable die therein located co-axially with said punch, said punch and die being rotatably adjustable within their respective retainers, said punch having a non-cylindrical punch terminal and said die having a punch-receiving opening conforming to said non-cylindrical punch terminal, and co-acting means for said die and die-retainer for determining the rotative adjustment thereof to correspond with the position given said punch.

17. Punch and die mechanism, comprising spaced-apart punch and die-holders relatively movable in a plane perpendicular to the confronting surfaces of said holders, a die-retainer having a die, a punch-retainer secured to said punch-holder and having a punch adapted to be located co-axially with said die by positioning and securing said die-retainer to its die-holder, said die having a non-circular punch-receiving opening and said punch having a correspondingly shaped punch terminal, said die being rotatably adjustable within said die-retainer and having means for co-action with said die-retainer to determine the position of said punch-receiving opening with respect to the punch-terminal of said punch.

18. Punch and die mechanism, comprising spaced-apart elements relatively movable toward and from each other, one of said elements having a punch-receiving hole and the other having a die-receiving socket, a punch removably entered in said punch-receiving hole, a die removably entered in said die-receiving socket, said punch and die being rotatably adjustable and having position-determining regions and said elements having means for co-action with said position-determining regions whereby said punch and die may be positioned in corresponding relation.

19. Punch and die mechanism, comprising spaced-apart elements, one having a punch-receiving hole and the other a die-receiving socket, a punch entered in said punch-receiving hole and rotatably adjustable therein, a die entered in said die-receiving socket and rotatably adjustable therein, said punch having a non-cylindrical punch terminal and said die having an opening therein corresponding to the cross-sectional formation of said punch terminal, and means on said punch and die for co-action with means on said elements to place either said punch or die in any desired rotative position and position the other in corresponding relation thereto.

20. The combination with two-spaced apart supports relatively movable in the direction of a plane at right angles to the confronting surfaces of said supports, a retainer secured to one of said supports and a retainer adapted to be applied to the other of said supports in a manner to permit of adjusting the same in proper relation to said secured retainer, one of said retainers having a punch-receiving hole and the other having a die-receiving socket, a set-up plug having terminals provided with position-determining regions adapted to be entered respectively in said punch-receiving hole and die-receiving socket, said retainers having means at fixed points thereof for co-action with the position-determining regions of said set-up plug, the latter so used being adapted to determine the rotative positions of the punch and die to be applied to said retainers.

21. The combination with two spaced-apart supports relatively movable in the direction of a plane at right angles to the confronting faces of said supports, a retainer secured to one of said supports and a retainer adapted to be applied to the other of said supports in a manner to permit of adjusting the same in proper relation to said secured retainer, means adapted to be interposed between said retainers having position-determining regions thereon, and means carried by said retainers for co-action with said position-determining regions whereby the angularity of said retainers may be determined with respect to a given plane passing through said supports.

22. In punch and die mechanism for perforating non-circular holes, a punch-member and a die-member, said die member comprising two parts including a die having a non-circular punch-receiving opening and said punch member comprising two parts including a punch having a non-circular punch terminal conforming to said punch-receiving opening, and co-acting means for the parts of at least one of said members enabling one part thereof to be rotatively and selectively adjusted to one of a plurality of positions so as to conform to the position of the co-acting part of the other member.

23. In punch and die mechanism for perforating non-circular holes, a punch and die couple comprising a punch member and a die member, each member of said couple having two parts and the two parts of at least one of said members being relatively rotatably adjustable and having co-acting means to selectively position the same in either of two rotatively adjustable positions.

24. In punch and die mechanism for perforating non-circular holes, a punch and die couple comprising a punch member and a die member, each member of said couple having two parts relatively rotatably adjustable, co-acting means on the two parts of each of said members to selectively position the same in either of two relatively adjustable positions so that co-acting parts of said punch and die members will be in true registration.

25. In punch and die mechanism for perforating non-circular holes, punch and die-retaining means, two co-acting perforating elements carried by said means, at least one of said perforating elements being rotatably adjustable in said retaining means, and a plurality of position-determining means for said last-mentioned perforating element partly on the same and partly on said retaining means to determine the rotative position of said perforating element so as to conform to the rotative position of its mating perforating element.

26. In punch and die mechanism for perforating non-circular holes, punch and die-retaining means, two co-acting perforating elements carried by said means, each of said perforating elements being rotatably adjustable in said retaining means and a plurality of position-determining means for each of said perforating elements partly thereon and partly on said retaining means to determine the rotative positions of said perforating elements and place the same in corresponding positions.

27. In a punch and die mechanism, a support having a flat face, a retainer-element secured to the flat face of said support in desired position and having a hole therein perpendicular to said flat face, a perforating element rotatably adjustable in said hole and provided with peripheral flat surfaces disposed at an angle to each other so that upon rotation of said element within said hole a selected flat surface may be brought to a given point in said hole, and means carried by said retainer-element engaging the selected flat surface to hold said perforating element in desired rotatively adjusted position within said retainer.

28. In a punch and die mechanism, a support, a retainer-element secured to said support and having a hole therein at an angle to said support and a threaded hole extending from one side thereof to said first-mentioned hole, a perforating element rotatably adjustable in said first-mentioned hole provided with peripheral flat surfaces disposed at a right-angle to each other so that upon rotation of said perforating element within said hole through an arc of 90°, either of said flat surfaces may be disposed at a right-angle to the axis of said threaded hole so as to confront the inner end of the latter, and a set-screw threaded into said threaded hole and having the inner end in contact with the said flat surface so disposed.

29. A set-up plug for positioning punch and die retainers on supports in proper relation to each other and in desired position to prepare for punching non-circular or elongated holes in sheet metal or other material, said set-up plug having terminals provided with flat surfaces disposed at an angle to each other and said flat surfaces being adapted to be positioned to confront definite circumferentially-disposed points of said retainers to position said retainers in corresponding relation, said flat surfaces having definite relation to the axis of a punch and die to be secured to the respective retainers.

30. In punch and die mechanism, a punch-retainer having a punch-receiving hole and a set-screw disposed at an angle to said punch-receiving hole, a punch entered in said punch-receiving hole and having circumferentially spaced-apart contact regions disposed in planes at an angle to each other and in line with said set-screw, said punch being rotatably adjustable to position a selected contact region in line with said set-screw, said punch being held in place by means of said set-screw, and a die-retainer having a die-receiving socket and a set-screw at an angle to said socket, a die rotatably adjustable in said socket and having circumferentially spaced-apart contact regions in planes at an angle to each other, said die being rotatably adjustable to position a selected contact region thereof in line with said last-mentioned set-screw, said die being held in place by means of said set-screw.

LAWRENCE V. WHISTLER.
SANFORD A. WHISTLER.